(12) United States Patent
Klein et al.

(10) Patent No.: US 7,446,944 B2
(45) Date of Patent: Nov. 4, 2008

(54) OBJECTIVE LENS

(75) Inventors: Juergen Klein, Cologne (DE); Juergen Noffke, Aalen (DE); Dietmar Gaengler, Langenau (DE)

(73) Assignee: Carl Zeiss AG, Oberkochen (DE)

( * ) Notice: Subject to any disclaimer, the term of this patent is extended or adjusted under 35 U.S.C. 154(b) by 0 days.

(21) Appl. No.: 11/714,524

(22) Filed: Mar. 6, 2007

(65) Prior Publication Data

US 2007/0236805 A1    Oct. 11, 2007

Related U.S. Application Data

(63) Continuation of application No. PCT/EP2005/009484, filed on Sep. 3, 2005.

(30) Foreign Application Priority Data

| | | |
|---|---|---|
| Sep. 7, 2004 | (DE) | 10 2004 043 611 |
| Sep. 7, 2004 | (DE) | 20 2004 020 515 U |
| May 25, 2005 | (DE) | 10 2005 025 204 |

(51) Int. Cl.
G02B 21/02 (2006.01)
G02B 15/14 (2006.01)
G02B 9/00 (2006.01)

(52) U.S. Cl. ............... 359/660; 359/656; 359/686; 359/739; 359/740; 359/808; 359/811; 359/822; 359/823

(58) Field of Classification Search ......... 359/656–661, 359/676–692, 808, 811, 819–830, 739–740

See application file for complete search history.

(56) References Cited

U.S. PATENT DOCUMENTS

| | | | | |
|---|---|---|---|---|
| 4,249,798 A | * | 2/1981 | Moskovich | 359/683 |
| 4,284,331 A | | 8/1981 | Tanaka | |
| 4,336,983 A | | 6/1982 | Tanaka et al. | |
| 4,726,669 A | * | 2/1988 | Angenieux | 359/740 |
| 5,381,268 A | | 1/1995 | Sato | |

FOREIGN PATENT DOCUMENTS

DE          79 08 085        8/1979

OTHER PUBLICATIONS

Kazuo Tanaka, A Zoom Lens without Focus Breating Phenomena, 2001, pp. 63-67.
Iain A. Neil, High Performance Wide Angle Objective Lens Systems With Internal Close Focusing Optics and Multiple Aspheric Surfaces For The Visible Waveband, pp. 216-241.
Iain A. Neil et al., High Performance, Wide Angle, Marco Focus, Zoom Lens For 35 mm Cinematography, pp. 213-228.

\* cited by examiner

*Primary Examiner*—Evelyn A. Lester
(74) *Attorney, Agent, or Firm*—Harness, Dickey & Pierce, P.L.C.

(57) ABSTRACT

An objective lens comprises a housing, an iris diaphragm and a plurality of lens groups. For focusing the objective lens while minimizing the variation of the image angle at least two lens groups are adapted to be moved relative to the housing. The one lens group is arranged in front of the iris diaphragm. The other lens group is arranged at least partially behind the iris diaphragm.

16 Claims, 8 Drawing Sheets

Example 1
Focal length: 49,99 mm

| Nr. | Radius | Distance | nd | nv |
|---|---|---|---|---|
| 1 | ∞ | 0.000 | | |
| 2 | - 290.07000 | 4.000 | 1.48751 | 70.40 |
| 3 | 50.11900 | 16.200 | | |
| 4 | - 122.32000 | 7.500 | 1.75528 | 27.58 |
| 5 | - 70.79500 | 11.700 | | |
| 6 | - 52.70800 | 4.100 | 1.65416 | 39.63 |
| 7 | - 658.79000 | 1.300 | | |
| 8 | 434.01000 | 18.000 | 1.52875 | 76.97 |
| 9 | - 60.43000 | 0.300 | | |
| 10 | 78.86300 | 15.400 | 1.49702 | 81.54 |
| 11 | - 196.68000 | 10.361 | | |
| 12 | 46.63900 | 16.700 | 1.72005 | 43.69 |
| 13 | - 143.30000 | 4.000 | 1.65416 | 39.63 |
| 14 | 103.66000 | 1.000 | | |
| 15 | 92.48961 | 4.000 | 1.71743 | 29.62 |
| 16 | 31.62300 | 9.320 | | |
| 17 | ∞ | 7.000 | | |
| 18 | - 31.85100 | 4.000 | 1.67276 | 32.21 |
| 19 | 114.65000 | 3.560 | | |
| 20 | - 170.31000 | 7.300 | 1.74104 | 52.64 |
| 21 | - 47.31500 | 0.200 | | |
| 22 | 202.42000 | 7.500 | 1.52857 | 76.97 |
| 23 | - 74.45200 | 0.200 | | |
| 24 | 69.78300 | 10.400 | 1.49702 | 81.54 |
| 25 | - 82.93700 | 36.004 | | |
| 26 | ∞ | 0.000 | | |

Aspherical Surface: S15
Series Constants:
A: -1.132e-006
B: 4.950e-010
C: -1.325e-013
D: 6.213e-016

Fig. 1B

Example 2:

Focal Length: 65,00 mm

| Nr. | Radius | Distance | nd | nv |
|---|---|---|---|---|
| 1 | ∞ | 2.551 | | |
| 2 | 554.31000 | 4.310 | 1.69901 | 30.13 |
| 3 | 82.93700 | 7.670 | | |
| 4 | 1539.90000 | 8.050 | 1.80527 | 25.42 |
| 5 | -185.67000 | 4.670 | 1.81605 | 46.62 |
| 6 | -188.36000 | 7.281 | | |
| 7 | 52.33000 | 16.110 | 1.61803 | 63.33 |
| 8 | 11548.00000 | 0.110 | | |
| 9 | 70.79500 | 4.200 | 1.71743 | 29.62 |
| 10 | 55.03300 | 2.534 | | |
| 11 | 42.47400 | 4.270 | 1.80527 | 25.42 |
| 12 | 35.48100 | 7.820 | 1.81605 | 46.62 |
| 13 | 46.63900 | 4.790 | | |
| 14 | 183.02000 | 4.200 | 1.55839 | 54.01 |
| 15 | 25.11900 | 9.800 | | |
| 16 | ∞ | 9.710 | | |
| 17 | -23.04100 | 4.200 | 1.65416 | 39.63 |
| 18 | 39.52500 | 16.230 | 1.61803 | 63.33 |
| 19 | -44.66800 | 0.350 | | |
| 20 | 66.47300 | 10.020 | 1.60303 | 65.44 |
| 21 | -240.57000 | 0.210 | | |
| 22 | 466.39000 | 7.510 | 1.60303 | 65.44 |
| 23 | -88.45271 | 0.100 | | |
| 24 | 91.72800 | 4.200 | 1.81605 | 46.62 |
| 25 | 27.98200 | 16.460 | 1.61803 | 63.33 |
| 26 | -128.64000 | 39.014 | | |
| 28 | ∞ | 0.00 | | |

Aspherical surface: S23

Series constants:
- A: 2.316e-006
- B: 1.036e-009
- C: -7.878e-013
- D: 1.079e-015

Fig. 2B

Example 3:

Focal Length: 74.98 mm

| Nr. | Radius | Distance | nd | nv |
|---|---|---|---|---|
| 1 | ∞ | 0.000 | | |
| 2 | -755.31000 | 7.800 | 1.51635 | 64.14 |
| 3 | 74.45200 | 11.000 | | |
| 4 | -446.68000 | 4.500 | 1.51682 | 64.17 |
| 5 | 68.78600 | 15.100 | 1.62017 | 63.48 |
| 6 | -403.88000 | 5.760 | | |
| 7 | 103.66000 | 14.000 | 1.43876 | 94.99 |
| 8 | -233.75000 | 5.410 | | |
| 9 | 67.80300 | 12.900 | 1.49702 | 81.54 |
| 10 | 453.16000 | 16.753 | | |
| 11 | 70.79500 | 11.850 | 1.71705 | 47.93 |
| 12 | -202.42000 | 11.500 | 1.65416 | 39.63 |
| 13 | 81.75200 | 6.413 | | |
| 14 | ∞ | 2.670 | | |
| 15 | -260.53296 | 3.600 | 1.71743 | 29.51 |
| 16 | 37.04700 | 8.900 | | |
| 17 | -35.22700 | 3.600 | 1.61664 | 36.63 |
| 18 | 52.70800 | 10.200 | 1.78805 | 47.37 |
| 19 | -53.08800 | 0.200 | | |
| 20 | -202.4200 | 5.700 | 1.81605 | 46.62 |
| 21 | -63.09600 | 0.200 | | |
| 22 | 50.11900 | 7.000 | 1.49702 | 81.54 |
| 23 | 1295.70000 | 36.153 | | |
| 24 | ∞ | 0.000 | | |

Aspherical surface: S15
Series constants:
A: 3.750e-006
B: 3.704e-010
C: -5.545e-013
D: 0.000e+000

Fig. 3B

Example 4:

Focal Length: 99.80 mm

| Nr. | Radius | Distance | nd | Nv |
|---|---|---|---|---|
| 1 | ∞ | 0.000 | | |
| 2 | - 1883.60000 | 4.700 | 1.54075 | 47.23 |
| 3 | 101.45000 | 3.140 | | |
| 4 | 127.72000 | 15.680 | 1.61803 | 63.33 |
| 5 | - 281.84000 | 0.200 | | |
| 6 | 66.35500 | 14.780 | 1.43876 | 94.99 |
| 7 | 202.42000 | 0.100 | | |
| 8 | 113.83000 | 4.850 | 1.80527 | 25.42 |
| 9 | 89.12500 | 14.959 | | |
| 10 | 52.33000 | 14.190 | 1.75704 | 47.82 |
| 11 | 381.29000 | 7.540 | | |
| 12 | - 230.02127 | 2.800 | 1.61344 | 44.29 |
| 13 | 29.64000 | 16.343 | | |
| 14 | ∞ | 18.938 | | |
| 15 | - 27.58200 | 2.970 | 1.61344 | 44.29 |
| 16 | 285.92000 | 12.520 | 1.69104 | 54.82 |
| 17 | - 41.86700 | 0.550 | | |
| 18 | 188.36000 | 8.180 | 1.69104 | 54.82 |
| 19 | - 76.07600 | 0.100 | | |
| 20 | 110.60000 | 10.690 | 1.60303 | 65.44 |
| 21 | - 46.30500 | 2.800 | 1.65416 | 39.63 |
| 22 | 153.99000 | 1.000 | | |
| 23 | 73.91800 | 4.220 | 1.49702 | 81.54 |
| 24 | 158.49000 | 40.123 | | |
| 25 | ∞ | 0.0 | | |

Aspherical surface: S12

Series constants:
- A: 8.669e-007
- B: 9.230e-011
- C: 2.783e-014
- D: -9.209e-016
- E: 1.576e-018
- F: -8.587e-022

Fig. 4B

OBJECTIVE LENS

CROSS-REFERENCE TO RELATED APPLICATIONS

This application is a continuation of International Patent Application PCT/EP2005/009484, filed on Sep. 3, 2005 and published in German language, which international patent application claims priority from German Patent Application No. 10 2004 043 611.8, filed Sep. 7, 2004; German Patent Application No. 20 2004 020 515.7, filed Sep. 7, 2004 and German Patent Application No. 10 2005 025 204.4, filed May 25, 2005. The disclosures of the above applications are incorporated herein by reference.

FIELD OF THE INVENTION

The present invention is related to the field of objective lenses.

More specifically, the invention is related to objective lenses in which no variation of the image angle occurs during focusing.

Still more specifically, the invention is related to an objective lens having a housing, an iris diaphragm and a plurality of lens groups, wherein for focusing the objective lens while minimizing the variation of the image angle at least two lens groups are adapted to be moved relative to the housing, and one of the two lens groups is arranged in front of the iris diaphragm.

BACKGROUND OF THE INVENTION

In zoom objective lenses having a plurality of lens groups, a separate front lens group is conventionally configured as a focus group and is moved during focusing. This separate focus group operates independently from those lens groups which vary the image scale during zooming. If no further measures are taken, the movement of the focus group during focusing of the image causes the image angle (also referred to as "image field angle") to vary.

In order to avoid this phenomenon, various measures have already been proposed, according to which the focus group is subdivided into two lens groups which are moved according to certain rules.

Document DE 79 08 085 U1 mentioned at the outset discloses several such concepts in which these two lens groups are arranged in front of the iris diaphragm of the objective lens. According to a first variant, one lens group of the focus group is held stationary and only the other one is moved. According to a second variant, both lens groups are simultaneously moved during focusing, however, at different speeds. When doing so, the position of a rear main plane of the entire lens system remains unchanged.

In an objective lens according to document U.S. Pat. No. 4,278,331 the two lens groups of the focus group being likewise positioned in front of the iris diaphragm, are moved in opposite directions relative to one another, such that the angle between a light beam directed onto the entrance pupil of the objective lens and the optical axis of the objective lens remains constant during focusing.

Document U.S. Pat. No. 4,336,983 describes another objective lens having means for avoiding a variation of the image angle during focusing. In this objective lens only one lens group being arranged in front of the iris diaphragm is moved during focusing. Two further lens groups are not moved during focusing. An iris diaphragm is provided between the second and the third lens group. The focal point of the combination of the second and the third lens group coincides with the exit pupil of the entire lens system.

The problem of avoiding variations of the image angle during focusing is also the subject of scientific publications, e.g. K. Tanaka "A Zoom Lens without Focus Breathing Phenomena", Proc. of SPIE Vol. 4487 (2001), pages 63-67; I. Neil "High Performance Wide Angle Objective Lens Systems with Internal Close Focusing Optics and Multiple Aspheric Surfaces for the Visible Waveband", SPIE, Vol. 2774, pages 216-242; I. Neil "High Performance, Wide Angle, Macro Focus, Zoom Lens for 35 mm Cinematography", SPIE Vol. 3482, pages 213-228.

The prior art objective lenses of the type specified before, have the disadvantage that due to the positioning of the moved focus group in front of the iris diaphragm negative influences occur with regard to the correction of the objective lens.

SUMMARY OF THE INVENTION

It is an object underlying the invention to improve an objective lens of the type specified at the outset such that the afore-specified disadvantages are avoided. In particular, the objective lens shall not cause a variation of the image angle during focusing, i.e. the object-sided image angle shall remain constant at a given image height for all distances to an object, without having negative implications on the possibility to correct the objective lens.

In an objective lens of the type specified at the outset, this object is achieved according to the invention in that the second lens group is arranged at least partially behind the iris diaphragm.

The object underlying the invention is thus entirely solved. By placing a focusing group into the rear portion of the objective lens, it is achieved in a surprisingly simple manner that an objective lens is created that may be corrected easily and that has no variation of the image angle during focusing.

Preferred embodiments of the invention are specified in claims 2 through 15.

It goes without saying that the features mentioned before and those that will be explained hereinafter may not only be used in the particularly given combination, but also in other combinations, or alone, without leaving the scope of the present invention.

BRIEF DESCRIPTION OF THE DRAWINGS

Embodiments of the invention are shown in the drawing and will be explained in further detail throughout the subsequent description.

FIG. 1B shows a data sheet of the objective lens according to FIG. 1A;

FIG. 2B shows a data sheet of the objective lens according to FIG. 2A;

FIG. 3B shows a data sheet of the objective lens according to FIG. 3A;

FIG. 4B shows a data sheet of the objective lens according to FIG. 4A.

DETAILED DESCRIPTION OF THE PREFERRED EMBODIMENTS

Figure 1A:
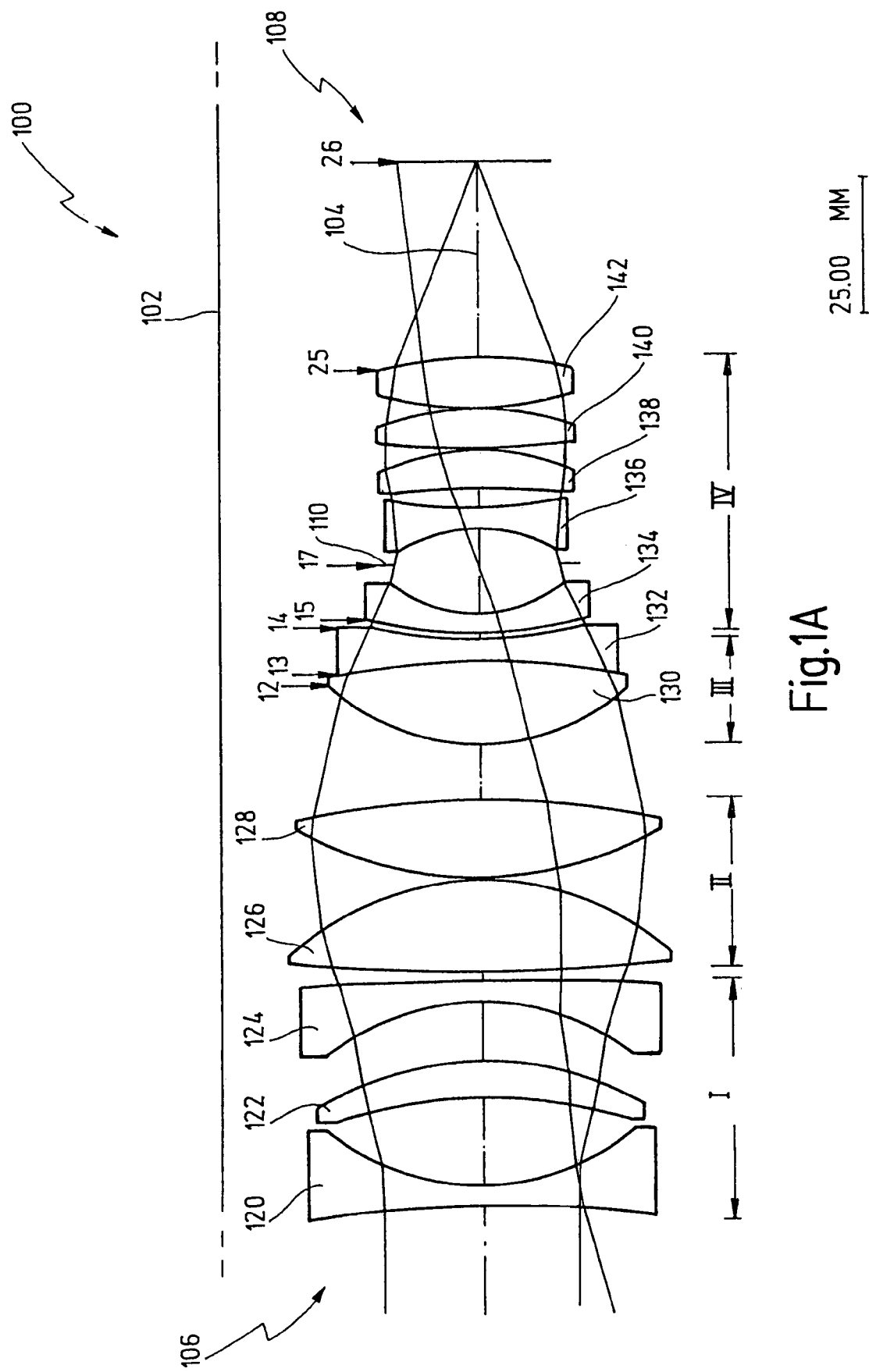
FIG. 1A shows a first embodiment of an objective lens according to the invention having twelve lenses in four lens groups.

In FIG. 1A reference numeral 100 indicates a first embodiment of an objective lens according to the invention. Objective lens 100 has a housing 102 with an optical axis 104 and four lens groups I, II, III, and IV arranged along optical axis 104. The front, i.e. object-sided end of objective lens 100 is designated 106 and the rear end is designated 108. Objective lens 100 has an iris diaphragm 110 positioned within fourth lens group IV. Iris diaphragm 110 may be connected to fourth lens group IV or with housing 102.

Lens groups I, II, III, and IV comprise a total of twelve lenses 120 to 142. From lenses 120 to 142, lenses 120 to 124 belong to first lens group I, lenses 126 to 128 belong to second lens group II, lenses 130 to 132 belong to third lens group III, and lenses 134 to 142 belong to fourth lens group IV.

The first two front lens groups I and II are preferably rigidly connected to housing 102. The two other lens groups III and IV, however, are movably journalled within housing 102. They may be moved independently from one another. For that purpose, two separate and differently configured guide grooves are, for example, provided at the periphery of a tube. Each one of these two grooves is a part of an individual drive train for one each of the two lens groups. Focusing is effected by a common actuator element. The elements required therefore are well-known to a person of ordinary skill, and, therefore, are not shown in FIG. 1A.

According to the conventional nomenclature the art of optical design, the surfaces and planes, respectively, are numbered in FIG. 1A as No. 1, 2, 3 . . . beginning at the left-hand side which holds also true for the other embodiments discussed further below and having different arrangements of lenses. For example, the sixth lens 130 has a left surface No. 12. The sixth lens 130 and the neighbored seventh lens 132 have a common surface No. 13.

According to the invention lenses 130 and 132 of third lens group III and lenses 134 to 142 of fourth lens group IV configure the two focus groups which may be moved independently from one another for focusing. Insofar, it is important to notice that fourth lens group IV is arranged partially behind iris diaphragm 110. One may also provide more than two focus groups.

Lens No. 15, preferably, is configured aspherical.

A preferred embodiment according to FIG. 1, and in the nomenclature of the so-called "code V" has the following data which are also depicted in FIG. 1B:

| Focal Length: | 49.99 mm |
| Aperture Stop Area: | 17 |
| Front Focus Group (III): | Surfaces No. 12 to 14 |
| Rear Focus Group (IV): | Surfaces No. 15 to 25 |

| Nr. | Radius | Distance | nd | nv |
| --- | --- | --- | --- | --- |
| 1 | ∞ | 0.000 | | |
| 2 | −290.07000 | 4.000 | 1.48751 | 70.40 |
| 3 | 50.11900 | 16.200 | | |
| 4 | −122.32000 | 7.500 | 1.75528 | 27.58 |
| 5 | −70.79500 | 11.700 | | |
| 6 | −52.70800 | 4.100 | 1.65416 | 39.63 |
| 7 | −658.79000 | 1.300 | | |
| 8 | 434.01000 | 18.000 | 1.52875 | 76.97 |
| 9 | −60.43000 | 0.300 | | |
| 10 | 78.86300 | 15.400 | 1.49702 | 81.54 |
| 11 | −196.68000 | 10.361 | | |
| 12 | 46.63900 | 16.700 | 1.72005 | 43.69 |
| 13 | −143.30000 | 4.000 | 1.65416 | 39.63 |
| 14 | 103.66000 | 1.000 | | |
| 15 | 92.48961 | 4.000 | 1.71743 | 29.62 |
| 16 | 31.62300 | 9.320 | | |
| 17 | ∞ | 7.000 | | |
| 18 | −31.85100 | 4.000 | 1.67276 | 32.21 |
| 19 | 114.65000 | 3.560 | | |
| 20 | −170.31000 | 7.300 | 1.74104 | 52.64 |
| 21 | −47.31500 | 0.200 | | |
| 22 | 202.42000 | 7.500 | 1.52857 | 76.97 |
| 23 | −74.45200 | 0.200 | | |
| 24 | 69.78300 | 10.400 | 1.49702 | 81.54 |
| 25 | −82.93700 | 36.004 | | |
| 26 | ∞ | 0.000 | | |

| Aspherical surface: | S15 | |
| --- | --- | --- |
| Series constants: | A: | −1.132e−006 |
| | B: | 4.950e−010 |
| | C: | −1.325e−013 |
| | D: | 6.213e−016 | wherein the quantities nd and vd are material designations for the particularly used class, namely nd is the index of refraction for a helium-d line of 587.56 nm and vd is the so-called Abbe number. The series constants A to D are the series constants known to the person of ordinary skill for aspherical optical surfaces (series expansion of the cone section).

Figure 2A:
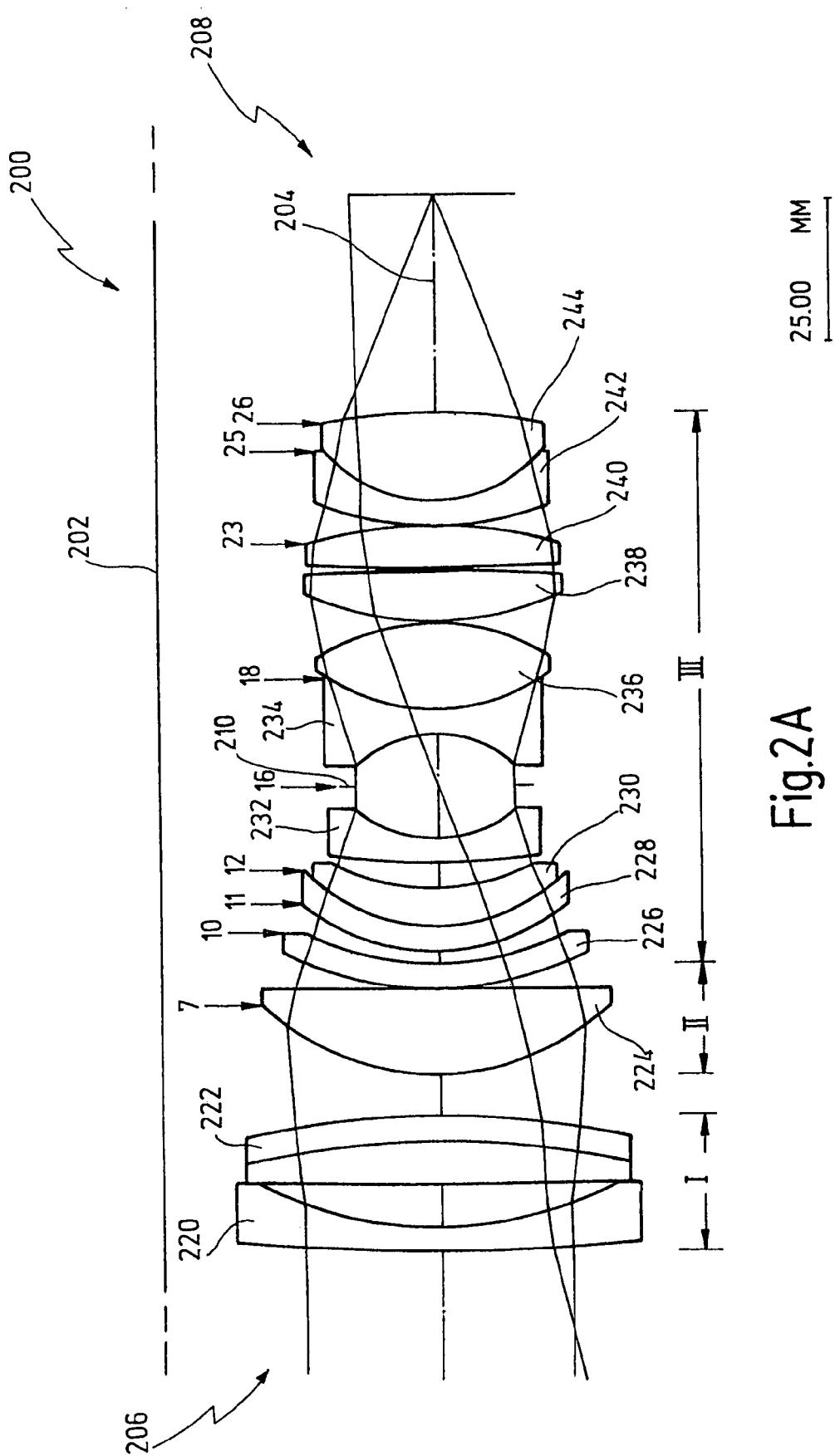
FIG. 2A shows a second embodiment of an objective lens according to the invention having thirteen lenses in three lens groups.

In FIG. 2A, reference numeral 200 designates a second embodiment of an objective lens according to the invention. Objective lens 200 has a housing 202, an optical axis 204 and three lens groups I, II, and III arranged along the latter. The front, i.e. object sided end of objective lens 200, is designated 206 and the rear end is designated 208. Objective lens 200 has an iris diaphragm 210 positioned within third lens group III. Iris diaphragm 210 may be connected to third lens group III or to housing 202.

Lens groups I, II, and III comprise a total of thirteen lenses 220 through 244. Lenses 220 and 222 belong to first lens group I, lenses 224 and 226 belong to second lens group II, and lenses 228 to 244 belong to third lens group III.

The first, front lens group I, preferably, is rigidly connected to housing 202. The two other lens groups II and III, however, are movable journalled within housing 202. They may be moved independently from one another.

Fifth lens 228 and neighbored sixth lens 230 configure a common surface No. 12. This applies, mutatis mutandis, for eighth lens 234 and ninth lens 236, as well as for twelfth lens 242 and thirteenth lens 244 with common surfaces No. 18 and No. 25, respectively.

According to the invention, lenses 224 and 226 of second lens group II and lenses 228 to 244 of third lens group III configure the two focus groups which are movable independently from one another for focusing. Insofar, it is important to note that third lens group III is partially positioned behind iris diaphragm 210.

Surface No. 23, preferably, is configured aspherical.

A preferred embodiment according to FIG. 2A has the following data which are also shown in FIG. 2B:

| Focal Length: | 65.00 mm |
| Aperture Stop Area: | 16 |
| Front Focus Group (II): | Surfaces No. 7 to 10 |

-continued

| Rear Focus Group (III): | | Surfaces No. 11 to 26 | |
|---|---|---|---|
| Nr. | Radius | Distance | nd | nv |
| 1 | ∞ | 2.551 | | |
| 2 | 554.31000 | 4.310 | 1.69901 | 30.13 |
| 3 | 82.93700 | 7.670 | | |
| 4 | 1539.90000 | 8.050 | 1.80527 | 25.42 |
| 5 | −185.67000 | 4.670 | 1.81605 | 46.62 |
| 6 | −188.36000 | 7.281 | | |
| 7 | 52.33000 | 16.110 | 1.61803 | 63.33 |
| 8 | 11548.00000 | 0.110 | | |
| 9 | 70.79500 | 4.200 | 1.71743 | 29.62 |
| 10 | 55.03300 | 2.534 | | |
| 11 | 42.47400 | 4.270 | 1.80527 | 25.42 |
| 12 | 35.48100 | 7.820 | 1.81605 | 46.62 |
| 13 | 46.63900 | 4.790 | | |
| 14 | 183.02000 | 4.200 | 1.55839 | 54.01 |
| 15 | 25.11900 | 9.800 | | |
| 16 | ∞ | 9.710 | | |
| 17 | −23.04100 | 4.200 | 1.65416 | 39.63 |
| 18 | 39.52500 | 16.230 | 1.61803 | 63.33 |
| 19 | −44.66800 | 0.350 | | |
| 20 | 66.47300 | 10.020 | 1.60303 | 65.44 |
| 21 | −240.57000 | 0.210 | | |
| 22 | 466.39000 | 7.510 | 1.60303 | 65.44 |
| 23 | −88.45271 | 0.100 | | |
| 24 | 91.72800 | 4.200 | 1.81605 | 46.62 |
| 25 | 27.98200 | 16.460 | 1.61803 | 63.33 |
| 26 | −128.64000 | 39.014 | | |
| 28 | ∞ | 0.00 | | |

| Aspherical surface: | S23 | |
|---|---|---|
| Series constants: | A: | 2.316e−006 |
| | B: | 1.036e−009 |
| | C: | −7.878e−013 |
| | D: | 1.079e−015 |

| Focal Length: | 74.98 mm |
|---|---|
| Aperture Stop Area: | 14 |
| Front Focus Group (III): | Surfaces No. 11 to 13 |
| Rear Focus Group (IV): | Surfaces No. 14 to 23 |

| Nr. | Radius | Distance | nd | nv |
|---|---|---|---|---|
| 1 | ∞ | 0.000 | | |
| 2 | −755.31000 | 7.800 | 1.51635 | 64.14 |
| 3 | 74.45200 | 11.000 | | |
| 4 | −446.68000 | 4.500 | 1.51682 | 64.17 |
| 5 | 68.78600 | 15.100 | 1.62017 | 63.48 |
| 6 | −403.88000 | 5.760 | | |
| 7 | 103.66000 | 14.000 | 1.43876 | 94.99 |
| 8 | −233.75000 | 5.410 | | |
| 9 | 67.80300 | 12.900 | 1.49702 | 81.54 |
| 10 | 453.16000 | 16.753 | | |
| 11 | 70.79500 | 11.850 | 1.71705 | 47.93 |
| 12 | −202.42000 | 11.500 | 1.65416 | 39.63 |
| 13 | 81.75200 | 6.413 | | |
| 14 | ∞ | 2.670 | | |
| 15 | −260.53296 | 3.600 | 1.71743 | 29.51 |
| 16 | 37.04700 | 8.900 | | |
| 17 | −35.22700 | 3.600 | 1.61664 | 36.63 |
| 18 | 52.70800 | 10.200 | 1.78805 | 47.37 |
| 19 | −53.08800 | 0.200 | | |
| 20 | −202.4200 | 5.700 | 1.81605 | 46.62 |
| 21 | −63.09600 | 0.200 | | |
| 22 | 50.11900 | 7.000 | 1.49702 | 81.54 |
| 23 | 1295.70000 | 36.153 | | |
| 24 | ∞ | 0.000 | | |

| Aspherical surface: | S15 | |
|---|---|---|
| Series constants: | A: | 3.750e−006 |
| | B: | 3.704e−010 |
| | C: | −5.545e−013 |
| | D: | 0.000e+000 |

Figure 3A:
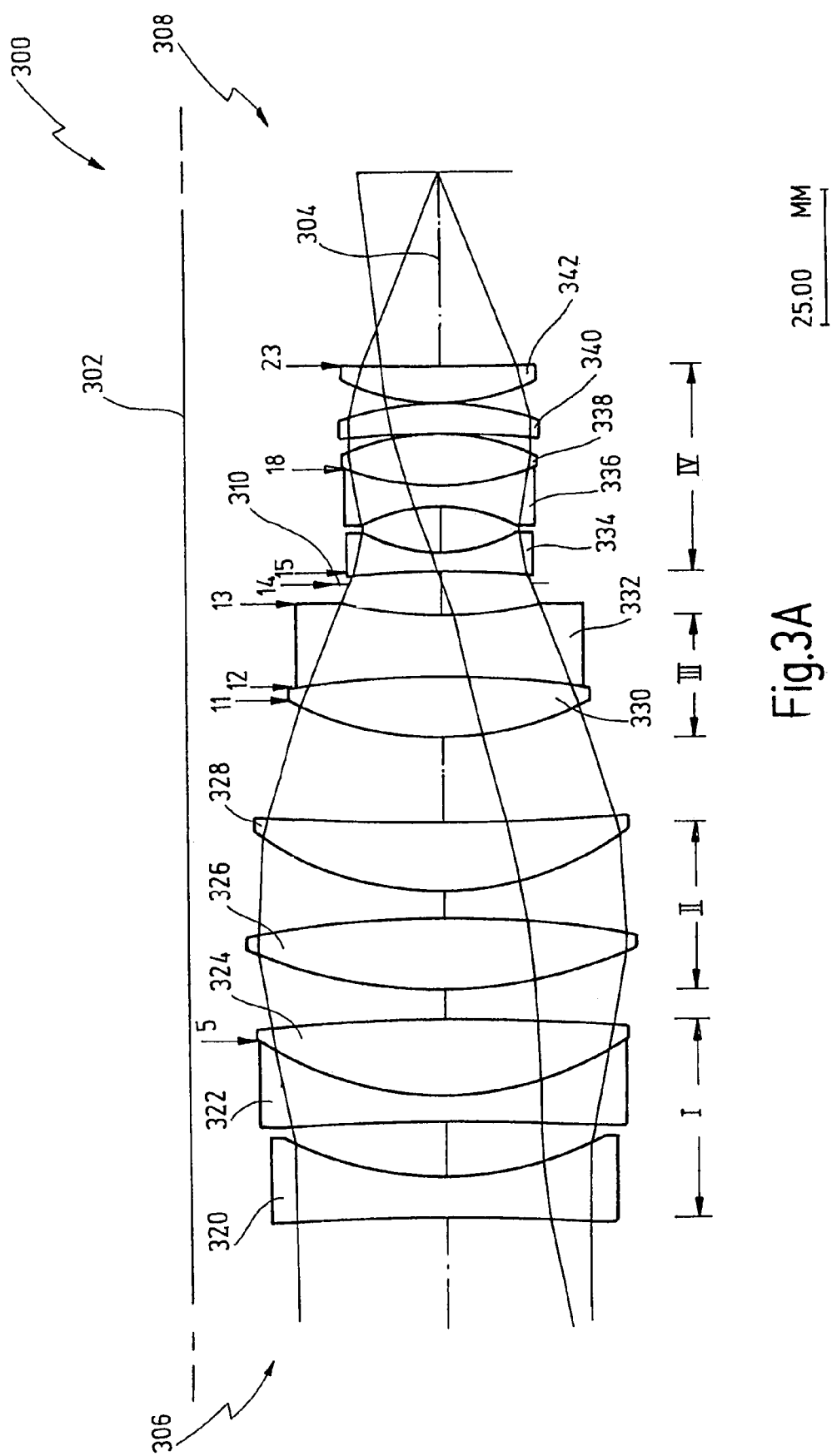
FIG. 3A shows a third embodiment of an objective lens according to the invention having twelve lenses in four lens groups.

In FIG. 3A, reference numeral 300 designates a third embodiment of an objective lens according to the invention. Objective lens 300 has a housing 302 with an optical axis 304 and four lens groups I, II, III, and IV arranged along the latter. The front, i.e. the object-sided end of objective lens 300, is designated 306 and the rear end is designated 308. Objective lens 300 has an iris diaphragm 310 arranged in front of fourth lens group IV. Iris diaphragm 310 may be connected to fourth lens group IV or to housing 302.

Lens groups I, II, III, and IV comprise a total of twelve lenses 320 to 342. Lenses 320 to 324 belong to first lens group I, lenses 326 and 328 belong to second lens group II, lenses 330 and 332 belong to third lens group III, and lenses 334 to 342 belong to fourth lens group IV.

The first and the second front lens groups I and II are, preferably, rigidly connected to housing 302. The two other lens groups III and IV, however, are movably journalled within housing 302. They may be moved independently from one another.

Second lens 322 and neighbored third lens 324 configure a common surface No. 5. This holds also true, mutatis mutandis, for sixth lens 330 and seventh lens 332, as well as for ninth lens 336 and tenth lens 338 having common surfaces No. 12 and No. 18, respectively.

According to the invention, lenses 330 and 332 of third lens group III and lenses 334 to 342 of fourth lens group IV configure the two focus groups which may be moved independently from one another for focusing. Insofar, it is important to note that fourth lens group IV is positioned behind iris diaphragm 310.

Surface No. 15, preferably, is configured aspherical.

Figure 4A:
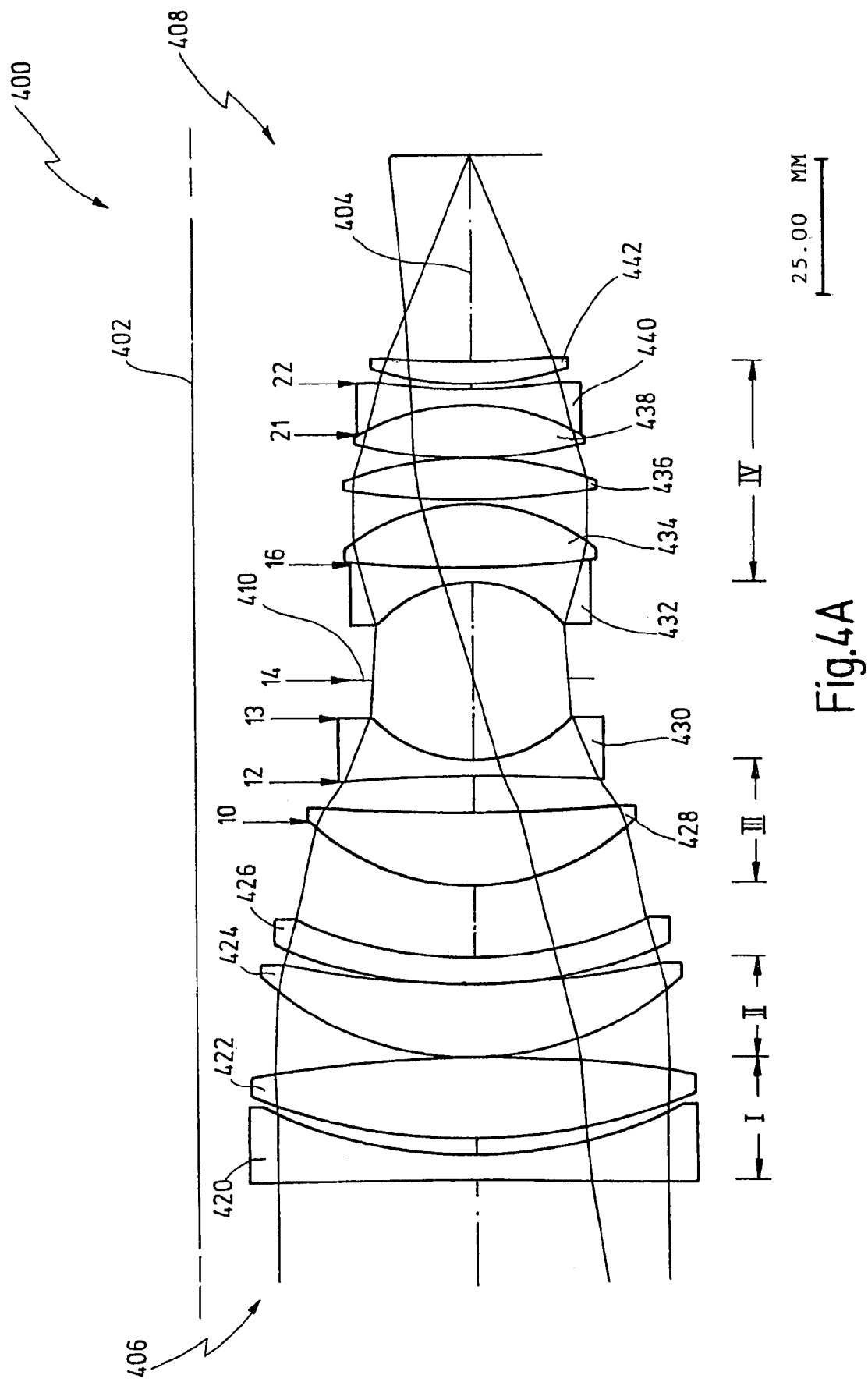
FIG. 4A shows a fourth embodiment of an objective lens according to the invention having twelve lenses in four lens groups.

A preferred embodiment according to FIG. 3 has the following data and is also shown in FIG. 3B:

In FIG. 4A, reference numeral 400 designates a fourth embodiment of an objective lens according to the invention. Objective lens 400 has a housing 402 with an optical axis 404, and four lens groups I, II, III, and IV arranged along the latter. The front, i.e. the object-sided end of objective lens 400, is designated 406, and the rear end is designated 408. Objective lens 400 has an iris diaphragm 410 which is positioned in front of fourth lens group IV. Iris diaphragm 410 may be connected to fourth lens group IV or to housing 402.

Lens groups I, II, III, and IV comprise a total of twelve lenses 420 to 442. Lenses 420 and 422 belong to first lens group I, lenses 424 and 426 belong to second lens group II, lenses 428 and 430 belong to third lens group III, and lenses 432 to 442 belong to fourth lens group IV.

The first and the second, front lens groups I and II are, preferably, rigidly connected to housing 402. The two other lens groups III and IV, however, are movably journalled within housing 402. They may be moved independently from one another.

Seventh lens 432 and neighbored eighth lens 434 configure a common surface No. 16. This holds also true, mutatis mutandis, for tenth lens 438 and eleventh lens 440 having a common surface No. 21.

According to the invention, lenses 428 and 430 of third lens group III and lenses 432 to 442 of fourth lens group IV configure the two focus groups which may be moved independently from one another for focusing. Insofar, it is important to note that fourth lens group IV is positioned behind iris diaphragm 410.

Surface No. 12, preferably, is configured aspherical.

A preferred embodiment according to FIG. 4A has the following data which are also shown in FIG. 4B:

| | | | | |
|---|---|---|---|---|
| Focal Length: | | 99.80 mm | | |
| Aperture Stop Area: | | 14 | | |
| Front Focus Group (III): | | Surfaces No. 10 to 13 | | |
| Rear Focus Group (IV): | | Surfaces No. 14 to 22 | | |
| Nr. | Radius | Distance | nd | Nv |
| 1 | ∞ | 0.000 | | |
| 2 | −1883.60000 | 4.700 | 1.54075 | 47.23 |
| 3 | 101.45000 | 3.140 | | |
| 4 | 127.72000 | 15.680 | 1.61803 | 63.33 |
| 5 | −281.84000 | 0.200 | | |
| 6 | 66.35500 | 14.780 | 1.43876 | 94.99 |
| 7 | 202.42000 | 0.100 | | |
| 8 | 113.83000 | 4.850 | 1.80527 | 25.42 |
| 9 | 89.12500 | 14.959 | | |
| 10 | 52.33000 | 14.190 | 1.75704 | 47.82 |
| 11 | 381.29000 | 7.540 | | |
| 12 | −230.02127 | 2.800 | 1.61344 | 44.29 |
| 13 | 29.64000 | 16.343 | | |
| 14 | ∞ | 18.938 | | |
| 15 | −27.58200 | 2.970 | 1.61344 | 44.29 |
| 16 | 285.92000 | 12.520 | 1.69104 | 54.82 |
| 17 | −41.86700 | 0.550 | | |
| 18 | 188.36000 | 8.180 | 1.69104 | 54.82 |
| 19 | −76.07600 | 0.100 | | |
| 20 | 110.60000 | 10.690 | 1.60303 | 65.44 |
| 21 | −46.30500 | 2.800 | 1.65416 | 39.63 |
| 22 | 153.99000 | 1.000 | | |
| 23 | 73.91800 | 4.220 | 1.49702 | 81.54 |
| 24 | 158.49000 | 40.123 | | |
| 25 | ∞ | 0.0 | | |
| Aspherical surface: | | S12 | | |
| Series constants: | | A: | 8.669e−007 | |
| | | B: | 9.230e−011 | |
| | | C: | 2.783e−014 | |
| | | D: | −9.209e−016 | |
| | | E: | 1.576e−018 | |
| | | F: | −8.587e−022 | |

For all embodiments described above, the following equation:

$$f'(e) = f'(\infty)/(1 - f'(e) * \beta(e)/APF)$$

preferably applies with a maximum deviation of less than 10% wherein f'(e) is the focal length of the objective lens when a distance e to an object is set, f'(∞) is the focal length of the objective lens when a distance ∞ to an object is set, β(e) is the imaging scale of the objective lens when a distance ∞ to an object is set, and APF is the distance between the exit pupil and the focal point. For the various lens groups in the four described embodiments, this results in the following values:

EXAMPLE 1

FIGS. 1A und 1B

| Lens Group | β(e) | f'(e) | f'(∞)/(1 − f'(e) * β(e)/APF) | Δ/% |
|---|---|---|---|---|
| I | 0.000 | 49.989 | 49.989 | 0.000 |
| II | 0.027 | 49.615 | 49.366 | 0.503 |
| III | 0.059 | 49.147 | 48.671 | 0.978 |
| IV | 0.142 | 47.834 | 47.010 | 1.753 |

EXAMPLE 2

FIGS. 2A und 2B

| Lens Group | β(e) | f'(e) | f'(∞)/(1 − f'(e) * β(e)/APF) | Δ/% |
|---|---|---|---|---|
| I | 0.000 | 65.000 | 65.000 | 0.000 |
| II | 0.074 | 64.523 | 64.169 | 0.551 |
| III | 0.125 | 64.216 | 63.612 | 0.950 |

EXAMPLE 3

FIGS. 3A und 3B

| Lens Group | β(e) | f'(e) | f'(∞)/(1 − f'(e) * β(e)/APF) | Δ/% |
|---|---|---|---|---|
| I | 0.000 | 74.985 | 74.985 | 0.000 |
| II | 0.015 | 74.599 | 74.237 | 0.488 |
| III | 0.040 | 73.940 | 73.086 | 1.169 |
| IV | 0.112 | 71.926 | 70.051 | 2.677 |

EXAMPLE 4

FIGS. 4A und 4B

| Lens Group | β(e) | f'(e) | f'(∞)/(1 − f'(e) * β(e)/APF) | Δ/% |
|---|---|---|---|---|
| I | 0.000 | 99.797 | 99.797 | 0.000 |
| II | 0.019 | 98.880 | 98.652 | 0.231 |
| III | 0.062 | 97.122 | 96.209 | 0.950 |
| IV | 0.114 | 95.399 | 93.311 | 2.238 |

The invention claimed is:

1. An objective lens having a housing, an iris diaphragm, and a plurality of lens groups, wherein, for focusing said objective lens while minimizing a variation of an image angle, at least two lens groups are adapted to be moved relative to said housing, one of said two lens groups being arranged in front of said iris diaphragm, and the other of said two lens groups being arranged at least partially behind said iris diaphragm;

wherein in said objective lens the condition:

$$f'(e) = f'(\infty)/(1 - f'(e) * \beta(e)/APF)$$

is fulfilled with a maximum deviation of less than 10%, wherein f'(e) is the focal length of said objective lens when a distance e to an object is set;

f'(∞) is the focal length of said objective lens when a distance ∞ to an object is set;

β(e) is the imaging scale of said objective lenses when a distance ∞ to an object is set; and APF is the distance between the exit pupil and the focal point.

2. The objective lens of claim 1, wherein said objective lens is a zoom objective lens.

3. The objective lens of claim 1, wherein said objective lens comprises four lens groups with a total of twelve lenses, of which a sixth and a seventh lens configure a common surface having the following data:

| | | | | |
|---|---|---|---|---|
| Focal Length: | | 49.99 mm | | |
| Aperture Stop Area: | | 17 | | |
| Front Focus Group (III): | | Surfaces No. 12 to 14 | | |
| Rear Focus Group (IV): | | Surfaces No. 15 to 25 | | |

| Nr. | Radius | Distance | nd | nv |
|---|---|---|---|---|
| 1 | ∞ | 0.000 | | |
| 2 | −290.07000 | 4.000 | 1.48751 | 70.40 |
| 3 | 50.11900 | 16.200 | | |
| 4 | −122.32000 | 7.500 | 1.75528 | 27.58 |
| 5 | −70.79500 | 11.700 | | |
| 6 | −52.70800 | 4.100 | 1.65416 | 39.63 |
| 7 | −658.79000 | 1.300 | | |
| 8 | 434.01000 | 18.000 | 1.52875 | 76.97 |
| 9 | −60.43000 | 0.300 | | |
| 10 | 78.86300 | 15.400 | 1.49702 | 81.54 |
| 11 | −196.68000 | 10.361 | | |
| 12 | 46.63900 | 16.700 | 1.72005 | 43.69 |
| 13 | −143.30000 | 4.000 | 1.65416 | 39.63 |
| 14 | 103.66000 | 1.000 | | |
| 15 | 92.48961 | 4.000 | 1.71743 | 29.62 |
| 16 | 31.62300 | 9.320 | | |
| 17 | ∞ | 7.000 | | |
| 18 | −31.85100 | 4.000 | 1.67276 | 32.21 |
| 19 | 114.65000 | 3.560 | | |
| 20 | −170.31000 | 7.300 | 1.74104 | 52.64 |
| 21 | −47.31500 | 0.200 | | |
| 22 | 202.42000 | 7.500 | 1.52857 | 76.97 |
| 23 | −74.45200 | 0.200 | | |
| 24 | 69.78300 | 10.400 | 1.49702 | 81.54 |
| 25 | −82.93700 | 36.004 | | |
| 26 | ∞ | 0.000 | | |

| | | | |
|---|---|---|---|
| Aspherical surface: | S15 | | |
| Series constants: | A: | −1.132e−006 | |
| | B: | 4.950e−010 | |
| | C: | −1.325e−013 | |
| | D: | 6.213e−016. | |

4. The objective lens of claim 3, wherein said lens groups have the values:

| Lens Group | $\beta(e)$ | f(e) | $f(\infty)/(1 - f(e) * \beta(e)/APF)$ | $\Delta/\%$ |
|---|---|---|---|---|
| I | 0.000 | 49.989 | 49.989 | 0.000 |
| II | 0.027 | 49.615 | 49.366 | 0.503 |
| III | 0.059 | 49.147 | 48.671 | 0.978 |
| IV | 0.142 | 47.834 | 47.010 | 1.753. |

5. The objective lens of claim 1, wherein said objective lens comprises three lens groups with a total of thirteen lenses, of which a fifth and a sixth, an eighth and a ninth, as well as a twelfth and a thirteenth lens configure a common surface having the following data:

| | | | | |
|---|---|---|---|---|
| Focal Length: | | 65.00 mm | | |
| Aperture Stop Area: | | 16 | | |
| Front Focus Group (II): | | Surfaces No. 7 to 10 | | |
| Rear Focus Group (III): | | Surfaces No. 11 to 26 | | |

| Nr. | Radius | Distance | nd | nv |
|---|---|---|---|---|
| 1 | ∞ | 2.551 | | |
| 2 | 554.31000 | 4.310 | 1.69901 | 30.13 |
| 3 | 82.93700 | 7.670 | | |
| 4 | 1539.90000 | 8.050 | 1.80527 | 25.42 |
| 5 | −185.67000 | 4.670 | 1.81605 | 46.62 |
| 6 | −188.36000 | 7.281 | | |
| 7 | 52.33000 | 16.110 | 1.61803 | 63.33 |
| 8 | 11548.00000 | 0.110 | | |
| 9 | 70.79500 | 4.200 | 1.71743 | 29.62 |
| 10 | 55.03300 | 2.534 | | |
| 11 | 42.47400 | 4.270 | 1.80527 | 25.42 |
| 12 | 35.48100 | 7.820 | 1.81605 | 46.62 |
| 13 | 46.63900 | 4.790 | | |
| 14 | 183.02000 | 4.200 | 1.55839 | 54.01 |
| 15 | 25.11900 | 9.800 | | |
| 16 | ∞ | 9.710 | | |
| 17 | −23.04100 | 4.200 | 1.65416 | 39.63 |
| 18 | 39.52500 | 16.230 | 1.61803 | 63.33 |
| 19 | −44.66800 | 0.350 | | |
| 20 | 66.47300 | 10.020 | 1.60303 | 65.44 |
| 21 | −240.57000 | 0.210 | | |
| 22 | 466.39000 | 7.510 | 1.60303 | 65.44 |
| 23 | −88.45271 | 0.100 | | |
| 24 | 91.72800 | 4.200 | 1.81605 | 46.62 |
| 25 | 27.98200 | 16.460 | 1.61803 | 63.33 |
| 26 | −128.64000 | 39.014 | | |
| 28 | ∞ | 0.00 | | |

| | | | |
|---|---|---|---|
| Aspherical surface: | S23 | | |
| Series constants: | A: | 2.316e−006 | |
| | B: | 1.036e−009 | |
| | C: | −7.878e−013 | |
| | D: | 1.079e−015. | |

6. The objective lens of claim 5, wherein said groups have the values:

| Lens Group | $\beta(e)$ | f(e) | $f(\infty)/(1 - f(e) * \beta(e)/APF)$ | $\Delta/\%$ |
|---|---|---|---|---|
| I | 0.000 | 65.000 | 65.000 | 0.000 |
| II | 0.074 | 64.523 | 64.169 | 0.551 |
| III | 0.125 | 64.216 | 63.612 | 0.950. |

7. The objective lens of claim 1, wherein said objective lens comprises four lens groups with a total of twelve lenses, wherein a second and a third, a sixth and a seventh, as well as a ninth and a tenth lens configure a common surface having the following data:

| | | | | |
|---|---|---|---|---|
| Focal Length: | | 74.98 mm | | |
| Aperture Stop Area: | | 14 | | |
| Front Focus Group (III): | | Surfaces No. 11 to 13 | | |
| Rear Focus Group (IV): | | Surfaces No. 14 to 23 | | |

| Nr. | Radius | Distance | nd | nv |
|---|---|---|---|---|
| 1 | ∞ | 0.000 | | |
| 2 | −755.31000 | 7.800 | 1.51635 | 64.14 |
| 3 | 74.45200 | 11.000 | | |
| 4 | −446.68000 | 4.500 | 1.51682 | 64.17 |
| 5 | 68.78600 | 15.100 | 1.62017 | 63.48 |
| 6 | −403.88000 | 5.760 | | |
| 7 | 103.66000 | 14.000 | 1.43876 | 94.99 |
| 8 | −233.75000 | 5.410 | | |
| 9 | 67.80300 | 12.900 | 1.49702 | 81.54 |
| 10 | 453.16000 | 16.753 | | |
| 11 | 70.79500 | 11.850 | 1.71705 | 47.93 |
| 12 | −202.42000 | 11.500 | 1.65416 | 39.63 |
| 13 | 81.75200 | 6.413 | | |
| 14 | ∞ | 2.670 | | |
| 15 | −260.53296 | 3.600 | 1.71743 | 29.51 |
| 16 | 37.04700 | 8.900 | | |
| 17 | −35.22700 | 3.600 | 1.61664 | 36.63 |
| 18 | 52.70800 | 10.200 | 1.78805 | 47.37 |
| 19 | −53.08800 | 0.200 | | |

-continued

| | | | | |
|---|---|---|---|---|
| 20 | −202.4200 | 5.700 | 1.81605 | 46.62 |
| 21 | −63.09600 | 0.200 | | |
| 22 | 50.11900 | 7.000 | 1.49702 | 81.54 |
| 23 | 1295.70000 | 36.153 | | |
| 24 | ∞ | 0.000 | | |

| Aspherical surface: | S15 | |
|---|---|---|
| Series constants: | A: | 3.750e−006 |
| | B: | 3.704e−010 |
| | C: | −5.545e−013 |
| | D: | 0.000e+000. |

8. The objective lens of claim 7, wherein said groups have the values:

| Lens Group | β(e) | f'(e) | f'(∞)/(1 − f'(e) * β(e)/APF) | Δ/% |
|---|---|---|---|---|
| I | 0.000 | 74.985 | 74.985 | 0.000 |
| II | 0.015 | 74.599 | 74.237 | 0.488 |
| III | 0.040 | 73.940 | 73.086 | 1.169 |
| IV | 0.112 | 71.926 | 70.051 | 2.677. |

9. The objective lens of claim 1, wherein said objective lens comprises four lens groups with a total of twelve lenses, of which a seventh and an eighth, as well as a tenth and an eleventh lens configure a common surface having the following data:

| Focal Length: | 99.80 mm |
|---|---|
| Aperture Stop Area: | 14 |
| Front Focus Group (III): | Surfaces No. 10 to 13 |
| Rear Focus Group (IV): | Surfaces No. 14 to 22 |

| Nr. | Radius | Distance | nd | Nv |
|---|---|---|---|---|
| 1 | ∞ | 0.000 | | |
| 2 | −1883.60000 | 4.700 | 1.54075 | 47.23 |
| 3 | 101.45000 | 3.140 | | |
| 4 | 127.72000 | 15.680 | 1.61803 | 63.33 |
| 5 | −281.84000 | 0.200 | | |
| 6 | 66.35500 | 14.780 | 1.43876 | 94.99 |
| 7 | 202.42000 | 0.100 | | |
| 8 | 113.83000 | 4.850 | 1.80527 | 25.42 |
| 9 | 89.12500 | 14.959 | | |
| 10 | 52.33000 | 14.190 | 1.75704 | 47.82 |
| 11 | 381.29000 | 7.540 | | |
| 12 | −230.02127 | 2.800 | 1.61344 | 44.29 |
| 13 | 29.64000 | 16.343 | | |

-continued

| | | | | |
|---|---|---|---|---|
| 14 | ∞ | 18.938 | | |
| 15 | −27.58200 | 2.970 | 1.61344 | 44.29 |
| 16 | 285.92000 | 12.520 | 1.69104 | 54.82 |
| 17 | −41.86700 | 0.550 | | |
| 18 | 188.36000 | 8.180 | 1.69104 | 54.82 |
| 19 | −76.07600 | 0.100 | | |
| 20 | 110.60000 | 10.690 | 1.60303 | 65.44 |
| 21 | −46.30500 | 2.800 | 1.65416 | 39.63 |
| 22 | 153.99000 | 1.000 | | |
| 23 | 73.91800 | 4.220 | 1.49702 | 81.54 |
| 24 | 158.49000 | 40.123 | | |
| 25 | ∞ | 0.0 | | |

| Aspherical surface: | S12 | |
|---|---|---|
| Series constants: | A: | 8.669e−007 |
| | B: | 9.230e−011 |
| | C: | 2.783e−014 |
| | D: | −9.209e−016 |
| | E: | 1.576e−018 |
| | F: | −8.587e−022. |

10. The objective lens of claim 9, wherein said groups have the values:

| Lens Group | β(e) | f'(e) | f'(∞)/(1 − f'(e) * β(e)/APF) | Δ/% |
|---|---|---|---|---|
| I | 0.000 | 99.797 | 99.797 | 0.000 |
| II | 0.019 | 98.880 | 98.652 | 0.231 |
| III | 0.062 | 97.122 | 96.209 | 0.950 |
| IV | 0.114 | 95.399 | 93.311 | 2.238. |

11. The objective lens of claim 1, wherein said iris diaphragm is arranged within a second lens group of said objective lens.

12. The objective lens of claim 11, wherein said second lens group is adapted to be moved together with said iris diaphragm.

13. The objective lens of claim 11, wherein the second lens group is rigidly connected to said housing.

14. The objective lens of claim 1, wherein said iris diaphragm is arranged in front of a second lens group of said objective lens.

15. The objective lens of claim 14, wherein said second lens group is adapted to be moved together with said iris diaphragm.

16. The objective lens of claim 14, wherein the second lens group is rigidly connected to said housing.

\* \* \* \* \*